(12) United States Patent
Chiel et al.

(10) Patent No.: US 9,508,265 B2
(45) Date of Patent: Nov. 29, 2016

(54) METHODS AND SYSTEMS FOR WIND MITIGATION IN AUTONOMOUS PARAFOIL GUIDANCE

(71) Applicant: THE CHARLES STARK DRAPER LABORATORY, INC., Cambridge, MA (US)

(72) Inventors: Benjamin S. Chiel, Allston, MA (US); Christopher Walden Dever, Cambridge, MA (US)

(73) Assignee: THE CHARLES STARK DRAPER LABORATORY, INC., Cambridge, MA (US)

( * ) Notice: Subject to any disclaimer, the term of this patent is extended or adjusted under 35 U.S.C. 154(b) by 94 days.

(21) Appl. No.: 14/340,018

(22) Filed: Jul. 24, 2014

(65) Prior Publication Data
US 2016/0027311 A1 Jan. 28, 2016

(51) Int. Cl.
| B64D 17/34 | (2006.01) |
| G05D 1/00 | (2006.01) |
| G08G 5/00 | (2006.01) |
| G08G 5/02 | (2006.01) |
| G05D 1/10 | (2006.01) |
| B64D 17/02 | (2006.01) |

(52) U.S. Cl.
CPC ............ *G08G 5/0091* (2013.01); *B64D 17/34* (2013.01); *G05D 1/105* (2013.01); *G08G 5/0021* (2013.01); *G08G 5/0069* (2013.01); *G08G 5/025* (2013.01); *B64D 17/025* (2013.01)

(58) Field of Classification Search
CPC ...... B64D 1/08; B64D 17/025; B64D 17/34; G05D 1/105
See application file for complete search history.

(56) References Cited

U.S. PATENT DOCUMENTS

| 5,522,567 A * | 6/1996 | Kinstler ............... G05D 1/105 244/3.15 |
| 6,343,244 B1 * | 1/2002 | Yoneda ............... G05D 1/105 701/3 |

(Continued)

OTHER PUBLICATIONS

D. Carter, S. George, P. Hattis, L. Singh, and S. Tavan. Autonomous Guidance, Navigation, and Control of Large Parafoils. American Institute of Aeronautics and Astronautics, 2005.
Rademacher, Branden J., "In-Flight trajectory planning and guidance for autonomous parafoils" (2009). Graduate Theses and Dissertations. Paper 10597.

(Continued)

*Primary Examiner* — Tien Dinh
*Assistant Examiner* — Richard R Green
(74) *Attorney, Agent, or Firm* — Lando & Anastasi, LLP

(57) ABSTRACT

According to one aspect, a flight controller constructed to control a parafoil in flight from a starting location to a target location is provided. The flight controller includes an interface constructed to connect to one or more actuators and one or more wind sensors, a memory, a processor coupled to the memory, the interface, and a flight manager component executable by the processor. The flight manager component is configured to identify the target location and the starting location, receive wind data, determine a relationship between a ground reference frame (GRF) and a wind fixed frame (WFF) based on the wind data, generate a trajectory between the starting location and the target location in the WFF, determine a desired heading based on the trajectory and the relationship between the GRF and the WFF, and generate an actuator control signal based on the desired heading to adjust a heading of the parafoil.

17 Claims, 11 Drawing Sheets

(56) References Cited

U.S. PATENT DOCUMENTS

| | | | |
|---|---|---|---|
| 8,131,405 B2* | 3/2012 | Preston | G05D 1/105 701/3 |
| 8,271,179 B2 | 9/2012 | Parras | |
| 8,437,891 B2* | 5/2013 | Yakimenko | G05D 1/105 701/4 |
| 8,781,719 B1 | 7/2014 | Bernhardt | |
| 2012/0303261 A1 | 11/2012 | Bernhardt | |

OTHER PUBLICATIONS

Ward, Michael. "Adaptive glide slope control for parafoil and payload aircraft" (2012). Graduate Theses and Dissertations.

* cited by examiner

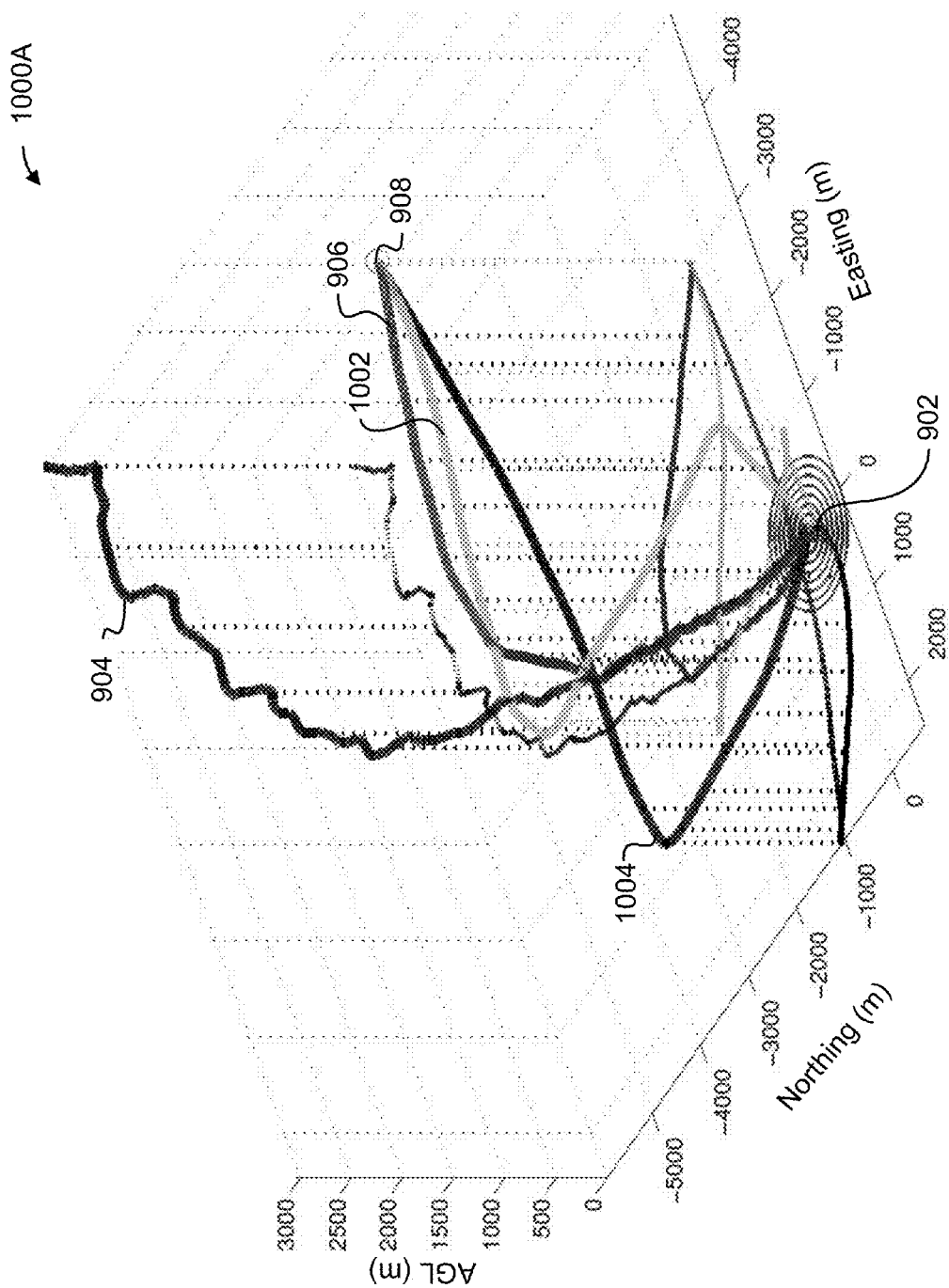

METHODS AND SYSTEMS FOR WIND MITIGATION IN AUTONOMOUS PARAFOIL GUIDANCE

FEDERALLY SPONSORED RESEARCH

This invention was made with U.S. government support under Government Contract Number W9124R-11-C-0005 awarded by Department of the Army. The U.S. government has certain rights in this invention.

BACKGROUND

Parafoils are typically non-rigid airfoils that include one or more suspension lines connected between the non-rigid airfoil and a payload (e.g., a skydiver or a supply crate). The parafoil slows the descent of the payload in the atmosphere through the generation of lift. The direction of travel of the parafoil during descent may be controlled by adjusting the tension of the one or more suspension lines connected between the payload and the airfoil.

SUMMARY OF INVENTION

Aspects and embodiments are directed to autonomous parafoil guidance in the presence of wind. As noted above, the direction of travel of a parafoil during descent may be controlled by adjusting the tension of one or more suspension lines between the payload and the parafoil. Autonomous parafoil systems may be constructed through the construction of a flight control system that adjusts the tension on the parafoil consistent with one or more control strategies to direct the autonomous parafoil system towards a ground target. The parafoil, however, may be particularly susceptible to wind conditions experienced during descent and blow the parafoil system downwind of the target. As discussed in more detail below, parafoil guidance methods and systems are provided that mitigate the effects of wind and thereby improve the likelihood of an autonomous parafoil system reaching an intended ground target.

According to one aspect, a flight controller constructed to control a parafoil in flight from a starting location to a target location is provided. The flight controller comprises an actuator interface constructed to connect to one or more actuators, a sensor interface constructed to connect to one or more wind sensors, a memory, at least one processor coupled to the memory, the sensor interface, and the actuator interface, and a flight manager component executable by the at least one processor. The flight manager component is configured to identify the target location and the starting location, receive wind data from the one or more wind sensors, determine a relationship between a ground reference frame and a wind fixed frame based on the wind data, generate at least one trajectory between the starting location and the target location in the wind fixed frame, determine a desired heading based on the at least one trajectory and the relationship between the ground reference frame and the wind fixed frame, and generate an actuator control signal based on the desired heading to adjust a heading of the parafoil.

In one embodiment, the flight manager component is further configured to generate a plurality of trajectories between the starting location and the target location. In one embodiment, at least one trajectory of the plurality of trajectories is from one of the nodal family of trajectories and the undulating family of trajectories. In one embodiment, the flight manager component is further configured to select an optimal trajectory from the plurality of trajectories that minimizes an amount of control energy expended while the parafoil system is in flight. In one embodiment, the flight manager component is further configured to select the optimal trajectory by at least one of grid optimization and SQP optimization. In one embodiment, the flight manager component is further configured to determine the desired heading based on the optimal trajectory.

In one embodiment, the flight manager is further configured to generate estimated wind data based on the received wind data. In one embodiment, the flight manager is further configured to determine a relationship between the ground reference frame and the wind fixed frame based on the received wind data and the estimated wind data.

According to one aspect, a flight controller constructed to control a parafoil in flight from a starting location to a target location is provided. The flight controller comprises an actuator interface constructed to connect to one or more actuators, a sensor interface constructed to connect to one or more wind sensors, a memory, at least one processor coupled to the memory, the sensor interface, and the actuator interface, and a flight manager component executable by the at least one processor. The flight manager component is configured to identify the target location and the starting location, receive wind data from the one or more wind sensors, determine whether wind mitigation is required based on the wind data, determine a desired heading by determining a direction that reduces a velocity of the parafoil towards the target responsive to determining that wind mitigation is required and determining the direction that yields a maximum velocity of the parafoil towards the target responsive to determining that wind mitigation is not required, and generate an actuator control signal based on the desired heading to adjust a heading of the parafoil.

In one embodiment, the flight manager component is further configured to determine whether wind mitigation is required based on determining whether a velocity of the parafoil towards the target exceeds a threshold value.

According to one aspect, a method to control a parafoil in flight from a starting location to a target location is provided. The method comprises identifying the target location and the starting location, receiving wind data, determining a relationship between a ground reference frame and a wind fixed frame based on the wind data, generating at least one trajectory between the starting location and the target location in the wind fixed frame, determining a desired heading based on the at least one trajectory, and generating an actuator control signal based on the desired heading to adjust a heading of the parafoil.

In one embodiment, generating the at least one trajectory includes generating a plurality of trajectories between the starting location and the target location in the wind fixed frame. In one embodiment, generating the plurality of trajectories includes generating one or more trajectories from at least one of the nodal family of trajectories and the undulating family of trajectories.

In one embodiment, the method further comprises selecting an optimal trajectory from the plurality of trajectories that minimizes an amount of control energy exerted while the parafoil system is in flight. In one embodiment, selecting the optimal trajectory includes selecting the optimal trajectory by one of grid optimization and SQP optimization. In one embodiment, determining the desired heading based on the at least one trajectory includes determining the desired heading based on the optimal trajectory.

In one embodiment, the method further comprises generating estimated wind data based on the received wind data. In one embodiment, determining the relationship between the ground reference frame and the wind fixed frame includes determining the relationship between the ground reference frame and the wind fixed frame based on the received wind data and the estimated wind data.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIGS. 10A-B are diagrams showing additional examples of planned paths generated by a homing process according to aspects of the invention.

DETAILED DESCRIPTION

Aspects and embodiments are directed to systems and methods for autonomous parafoil guidance in the presence of wind. Autonomous parafoil systems are typically dropped from a given altitude upwind of a ground target. The autonomous parafoil system employs one or more control strategies to adjust the tension of one or more suspension lines adjust the direction of travel of the parafoil system. As a generally lightweight aerial vehicle, the autonomous parafoil system may be particularly susceptible to wind, and may be blown downwind of the target. Accordingly, various wind mitigation control strategies are described herein that may improve the likelihood of an autonomous parafoil system reaching a specified target location.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements, and features discussed in connection with any one or more embodiments are not intended to be excluded from a similar role in any other embodiment. Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Example Autonomous Parafoil System

Figure 1:
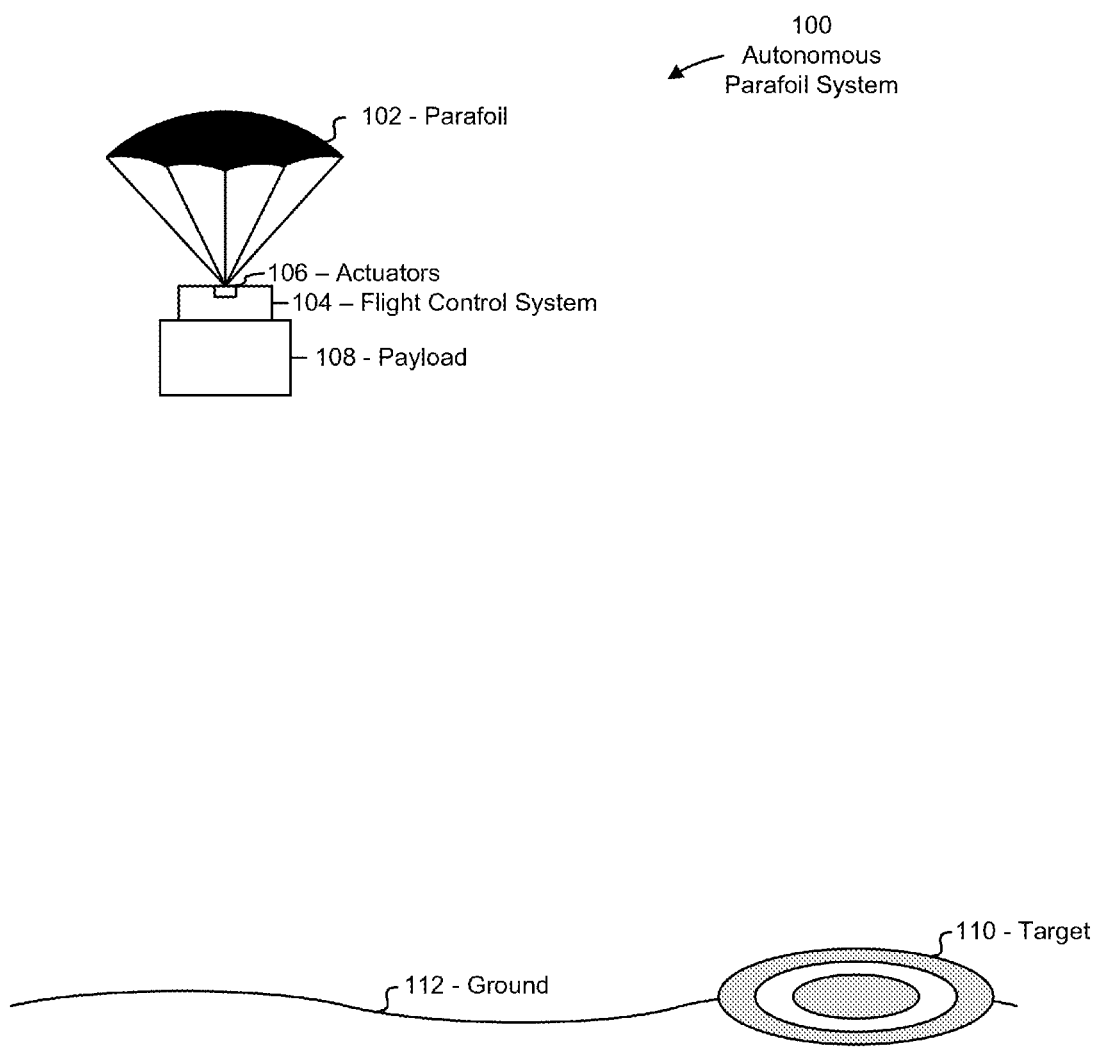
FIG. 1 is a block diagram of one example of a payload delivery system.

FIG. 1 illustrates an autonomous parafoil system 100. In some embodiments, the autonomous parafoil system 100 is constructed to carry a payload 108 to a target location 110 on the ground 112. In these embodiments, the autonomous parafoil system 100 is deployed from an aerial vehicle (e.g., a cargo plane) at a given altitude and flies to the target location 110 in the presence of various environmental conditions including, for example, windy conditions.

The autonomous parafoil system 100 includes a flight control system 104 constructed to adjust the tension of the suspension lines between the parafoil 102 and the flight control system 104 via actuators 106. The flight control system 104 may determine the appropriate amount of tension by one or more processes executed by a flight controller within the flight control system 104. An example flight controller is described below with reference to FIG. 2 and example processes executed by the flight controller are also described below with reference to FIGS. 3-6.

Example Flight Controller

Figure 2:
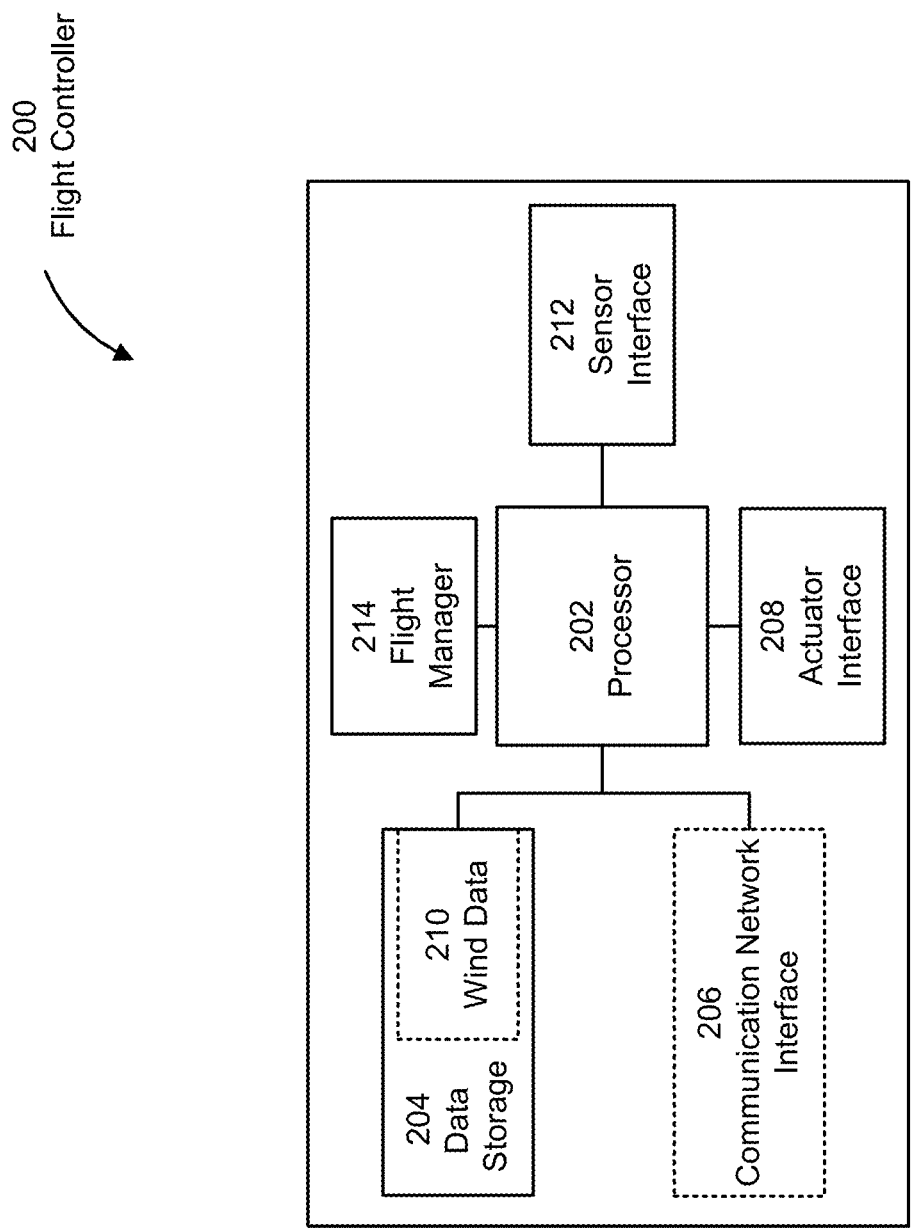
FIG. 2 is a functional block diagram of one example of a flight controller according to aspects of the invention.

FIG. 2 illustrates a flight controller 200 that is configured to control the flight path of an autonomous parafoil system (e.g., autonomous parafoil system 100). As shown in FIG. 2, the flight controller 200 comprises a processor 202 coupled to data storage 204, an optional communication network interface 206, an actuator interface 208, a sensor interface 212, and a flight manager 214. The data storage 204 optionally stores wind data 210.

According to the embodiment illustrated in FIG. 2, the processor 202 performs a series of instructions that result in manipulated data which are stored in and retrieved from the data storage 204. According to a variety of examples, the processor 202 is a commercially available processor, such as a processor manufactured by Texas Instruments, Intel, AMD, Sun, IBM, Motorola, and ARM Holdings, for example. However, the processor 202 may be any type of processor, multiprocessor or controller, whether commercially available or specially manufactured.

In addition, in several embodiments the processor 202 is configured to execute a conventional real-time operating system (RTOS), such as RTLinux. In these examples, the RTOS may provide platform services to application software, such as some examples of the flight manager 214 which is discussed further below. These platform services may include inter-process and network communication, file system management, and standard data store manipulation. One or more of many operating systems may be used, and examples are not limited to any particular operating system or operating system characteristic. For instance, in some examples, the processor 202 may be configured to execute a non-real time operating system, such as BSD or GNU/Linux. It is appreciated that the processor 202 may execute an Operating System Abstraction Library (OSAL).

The flight manager 214 may be implemented using hardware or a combination of hardware and software. For instance, in one example, the flight manager 214 is implemented as a software component that is stored within the data storage 204 and executed by the processor 202. In this example, the instructions included in the flight manager 214 program the processor 202 to generate control signals for one or more actuators coupled to the actuator interface 208 of the flight controller 200 based on an autonomous parafoil guidance strategy. In other examples, flight manager 214 may be an application-specific integrated circuit (ASIC) that is coupled to the processor 202. Thus, examples of the flight manager 214 are not limited to a particular hardware or software implementation. Particular examples of the processes performed by the flight manager 214 are discussed further below with reference to FIGS. 3-6.

In some embodiments, the components disclosed herein, such as the flight manager 214, may read parameters that affect the functions performed by the components. These parameters may be physically stored in any form of suitable memory including volatile memory, such as RAM, or non-volatile memory, such as a flash memory or magnetic hard drive. In addition, the parameters may be logically stored in a propriety data structure, such as a database or file defined by a user mode application, or in a commonly shared data structure, such as an application registry that is defined by an operating system.

The data storage 204 includes a computer readable and writeable nonvolatile data storage medium configured to store non-transitory instructions and data. In addition, the data storage 204 includes processor memory that stores data during operation of the processor 202. In some examples, the processor memory includes a relatively high performance, volatile, random access memory such as dynamic random access memory (DRAM), static memory (SRAM) or synchronous DRAM. However, the processor memory may include any device for storing data, such as a non-volatile memory, with sufficient throughput and storage capacity to support the functions described herein. According to several examples, the processor 202 causes data to be read from the nonvolatile data storage medium into the processor memory prior to processing the data. In these examples, the processor 202 copies the data from the processor memory to the non-volatile storage medium after processing is complete. A variety of components may manage data movement between the non-volatile storage medium and the processor memory and examples are not limited to particular data management components. Further, examples are not limited to a particular memory, memory system, or data storage system.

The instructions stored on the data storage 204 may include executable programs or other code that can be executed by the processor 202. The instructions may be persistently stored as encoded signals, and the instructions may cause the processor 202 to perform the functions described herein. The data storage 204 also may include information that is recorded, on or in, the medium, and this information may be processed by the processor 202 during execution of instructions. The medium may, for example, be optical disk, magnetic disk or flash memory, among others, and may be permanently affixed to, or removable from, the flight controller 200.

In some embodiments, the wind data 210 includes data used by the flight manager 214 to improve the accuracy of the parafoil guidance strategy. More particularly, the wind data 210 may include wind velocity and direction at various altitudes and locations. The wind data 210 may be stored in any logical construction capable of storing information on a computer readable medium including, among other structures, flat files, indexed files, hierarchical databases, relational databases or object oriented databases. These data structures may be specifically configured to conserve storage space or increase data exchange performance. In addition, various examples organize the wind data 210 into particularized and, in some cases, unique structures to perform the functions disclosed herein. In these examples, the data structures are sized and arranged to store values for particular types of data, such as integers, floating point numbers, character strings, arrays, linked lists, and the like. It is appreciated that the flight manager 214 and the wind data 210 may be combined into a single component or re-organized so that a portion of the wind data 210 is included in the flight manager 214. Such variations in these and the other components illustrated in FIG. 2 are intended to be within the scope of the embodiments disclosed herein.

As shown in FIG. 2, the flight controller 200 includes several system interface components 206, 208, and 212. Each of these system interface components is configured to exchange (i.e., send or receive) data with one or more specialized devices that may be located within the housing of the flight controller 200 or elsewhere. The components used by the interfaces 206, 208, and 212 may include hardware components, software components or a combination of both hardware and software components. Within each interface, these components physically and logically couple the flight controller 200 to the specialized devices. This physical and logical coupling enables the flight controller 200 to both communicate with and, in some instances, power or control the operation of the specialized devices. These specialized devices may include communication devices, actuators, and sensors.

According to various examples, the hardware and software components of the interfaces 206, 208, and 212 implement a variety of coupling and communication techniques. In some examples, the interfaces 206, 208, and 212 use leads, cables or other wired connectors as conduits to exchange data between the flight controller 200 and specialized devices. In other examples, the interfaces 206, 208, and 212 communicate with specialized devices using wireless technologies such as radio frequency or infrared technology. The software components included in the interfaces 206, 208, and 212 enable the processor 202 to communicate with specialized devices. These software components may include elements such as objects, executable code, and populated data structures. Together, these software components provide software interfaces through which the processor 202 can exchange information with specialized devices. Moreover, in at least some examples where one or more specialized devices communicate using analog signals, the interfaces 206, 208, and 212 further include components configured to convert analog information into digital information, and vice-versa, to enable the processor 202 to communicate with specialized devices.

As discussed above, the system interface components 206, 208, and 212 shown in the example of FIG. 2 support different types of specialized devices. For instance, the components of the sensor interface 212 couple the processor 202 to one or more sensors such as accelerometers, global positioning systems, and/or anemometers. Thus, the various system interfaces incorporated in the flight controller 200 allow the device to interoperate with a wide variety of devices in various contexts.

In some embodiment, the flight controller 200 includes the optional communication network interface 206. In these embodiments, the components of the communication network interface 206 couple the processor 202 to one or more communication devices. To ensure data transfer is secure, in some examples, the flight controller 200 can transmit secure data via the communication network interface 206 using a variety of security measures. In other examples, the network interface 206 includes both a physical interface configured for wireless communication and a physical interface configured for wired communication. In some examples, the flight controller 200 is configured to exchange wind direction and velocity information with an external system via one or more communication devices coupled to the communication network interface 206.

The actuator interface 208 shown in FIG. 2 includes a combination of hardware and software components that allow the flight controller 200 to communicate with one or more actuators (e.g., actuators 106 of flight control system 104). For example, the flight manager 214 may generate one or more control signals based on an autonomous parafoil guidance strategy and communicate the control signals via the actuator interface 208 to adjust the tension of a parafoil suspension line.

The flight controller 200 has a variety of potential applications and is well suited to control an autonomous parafoil system (e.g., autonomous parafoil system 100) to a ground target in the presence of wind. The flight controller 200 may execute one or more processes to guide the autonomous parafoil system to its target location.

Example Flight Controller Processes

Figure 3:
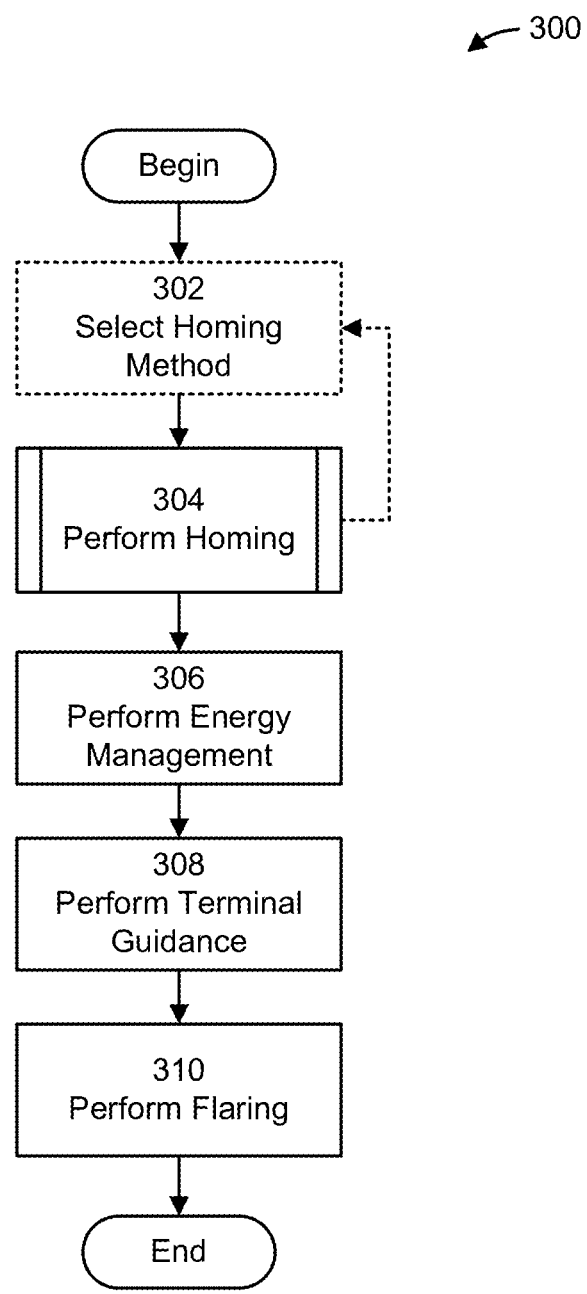
FIG. 3 is a flow diagram of one example of a landing process according to aspects of the invention.

FIG. 3 illustrates an embodiment of a flight control process 300. The flight control process 300 enables a flight controller (e.g., flight controller 200) to control a flight path of an autonomous parafoil system to a target location. The flight control process 300 may include a series of control strategies to land the autonomous parafoil guidance system based on the proximity of the parafoil to the target. For example, the flight control system 300 may fly towards the coordinates of the ground target in a homing stage 304 and subsequently reduce altitude by loitering in an energy management stage 306 after reaching the target coordinates. A terminal guidance stage 308 may be employed to guide the parafoil system to the precise target location on the ground and soften the landing in a flaring stage 310.

In optional act 302, the flight controller selects a homing guidance strategy to employ. Homing strategies, as described with reference to act 304, guide the parafoil system to the general target area. Various homing strategies may be employed based on environmental conditions (e.g., wind direction and velocity) in addition to the starting location of the parafoil relative to the target. In one embodiment, the flight controller selects a homing method based on an amount of available wind information. If the flight controller only has access to limited wind information, the flight controller selects a homing guidance strategy that requires less wind knowledge.

In act 304, the flight controller performs homing. Homing strategies guide the parafoil system from a starting location to the general target area. Various homing processes are described below with reference to FIGS. 4-6. It is appreciated that homing strategies described herein may also be employed to guide the parafoil system from a starting location to a target location on the ground and thereby omit performance of any combination of the subsequent acts (e.g., acts 306, 308, and 310) in flight control process 300.

In act 306, the flight controller performs energy management. Energy management strategies reduce the altitude of the parafoil system by loitering over a location. The flight controller may, for example, reduce the altitude of the parafoil system by directing the parafoil system in a series of FIG. 8 loops.

In act 308, the flight control system performs terminal guidance. Terminal guidance strategies guide the parafoil system from a location nearby the target to the target location. In act 310, the flight control system performs flaring. Flaring stage softens the landing of the payload delivery system.

It is appreciated that the various stages described above may be combined into any number of stages. For example, in one embodiment the energy management stage 306, the terminal guidance stage 308, and the flaring stage 310 are combined with the homing stage 304.

Example Homing Processes

Figure 4:
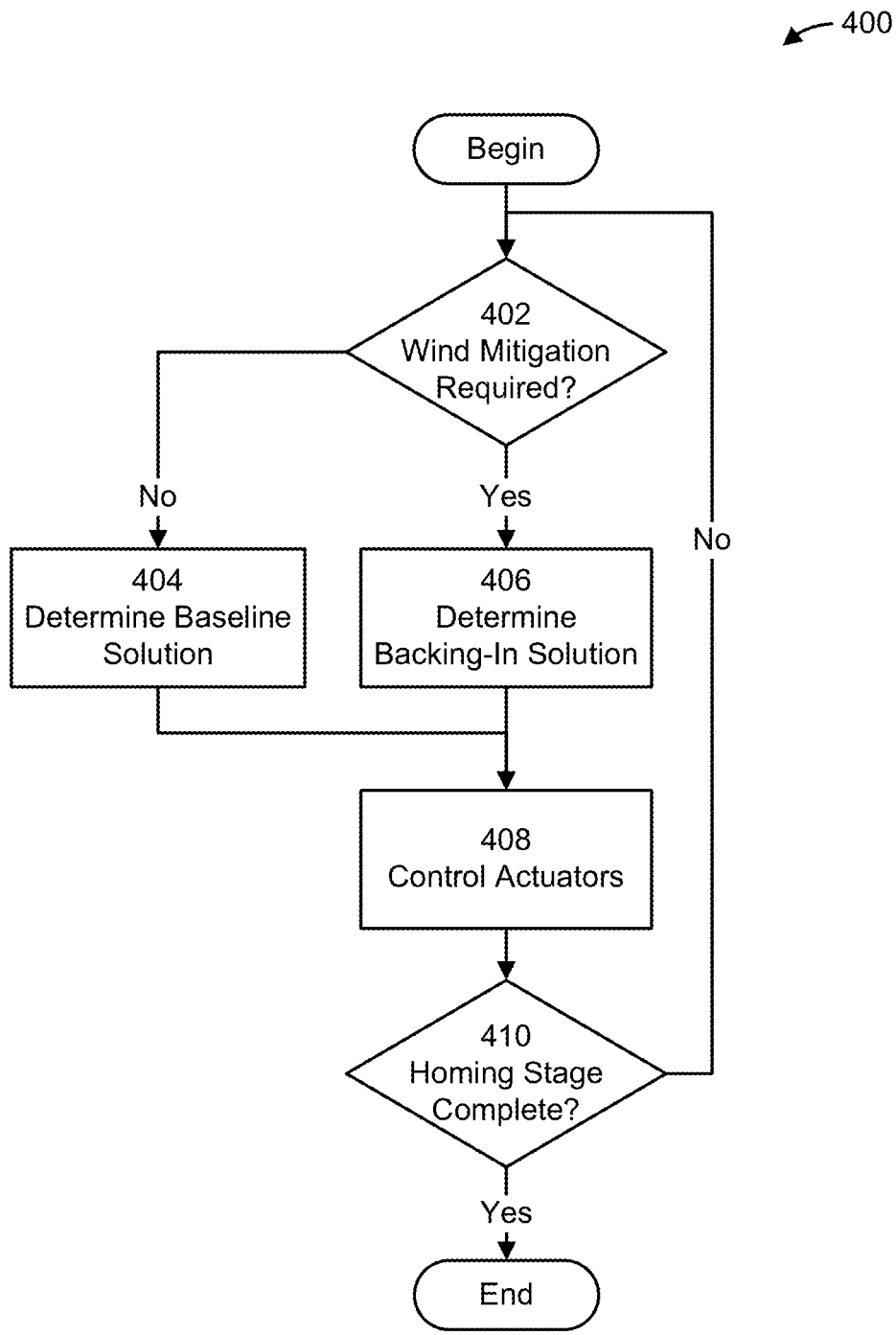
FIG. 4 is a flow diagram of one example of a homing process according to aspects of the invention.

FIG. 4 illustrates an embodiment of a homing process 400. The homing process 400 enables a flight controller (e.g., flight controller 200) to control a flight path of a parafoil system to a target location or a proximate area near the target location in the presence of wind. Homing process 400 mitigates the effect of wind by comparing a baseline solution where the parafoil is directed toward the target against a backing-in solution where the parafoil is directed away from the target. In the presence of sufficient wind velocity, the backing-in solution yields a forward direction of travel towards the target that is substantially slower than the baseline solution. The parafoil system may switch between the baseline solution and the backing-in solution during the homing process 400 to slow the average rate of travel towards the target location and thereby reduce the likelihood of the parafoil system being blown downwind of the target.

In act 402, the flight controller determines whether wind mitigation is required. The determination may be based on a ground velocity toward the target. For example, the system may determine in act 402 that wind mitigation is required because the velocity toward the target is above a threshold value. The threshold may be determined based on an estimated average translational velocity that will cause the parafoil to reach the target without overshoot. If the flight controller determines that wind mitigation is required, the system proceeds to act 406 where a backing-in salutation is determined that mitigates the effect of wind. Otherwise, the system proceeds to act 404 and uses a baseline solution that does not mitigate the effect of wind.

Figure 7B:
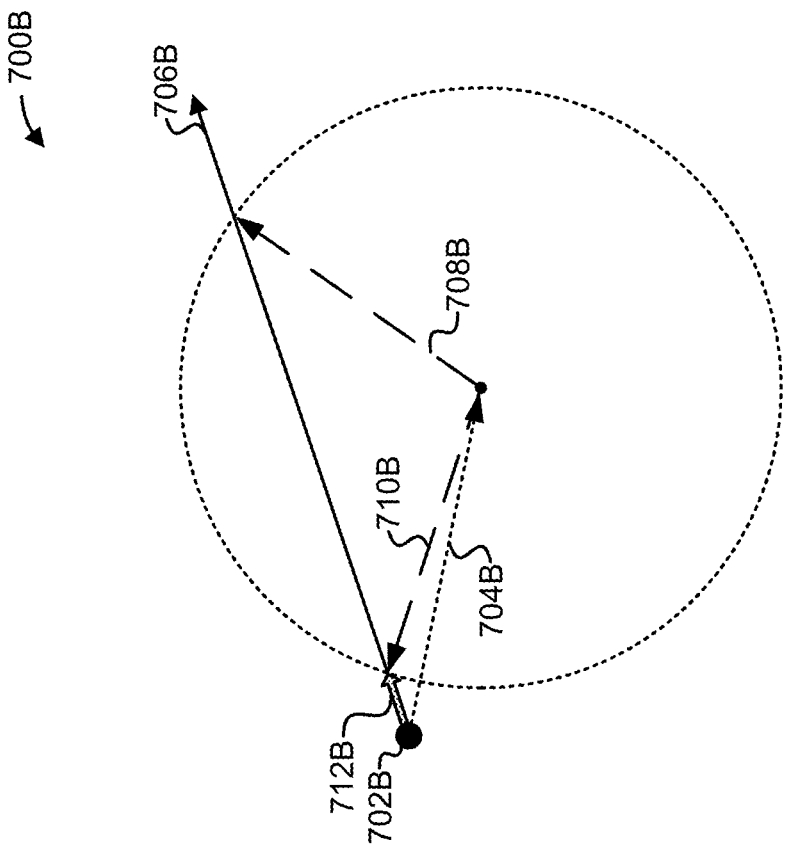
FIGS. 7A-B are diagrams illustrating examples of planned paths generated by a homing process according to aspects of the invention.
Figure 7A:
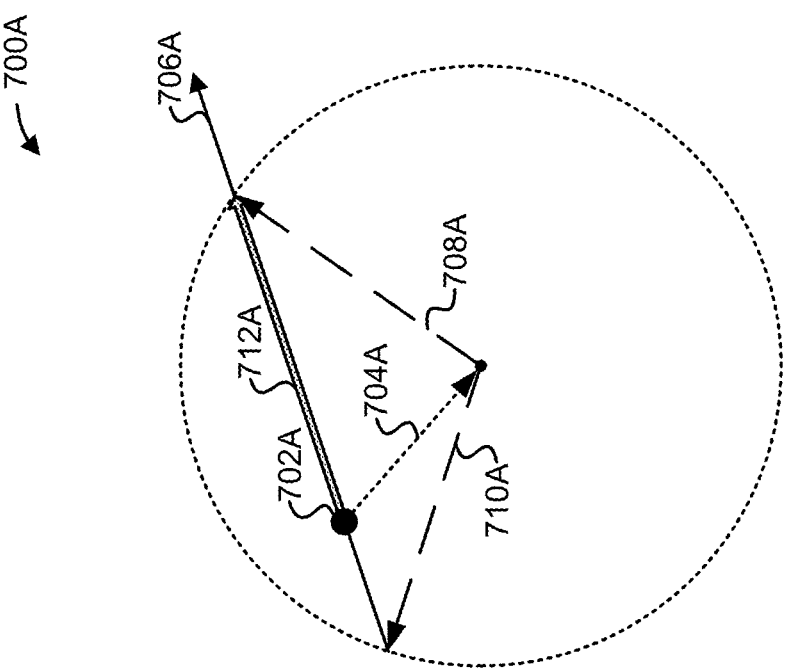

In act 404, the flight control system determines a baseline solution that does not mitigate the effect of wind. FIG. 7A illustrates a baseline homing strategy 700A. The baseline homing strategy 700A includes a current parafoil location 702A and a wind vector 704A that extends from the current parafoil location 702A. The direction towards the target from the current location is illustrated by direction 706A. Accordingly, a direction needs to be determined that counteracts the wind and yields a direction of travel towards the target. Solution vectors 708A and 710A compensate for the component of the wind vector 704A that is perpendicular to the desired direction of travel 706A. Solution 710A, however, yields a direction of travel of the parafoil that is opposite the desired direction illustrate by target direction 706A. Accordingly, solution 708A is selected that yields parafoil motion vector 712A. The parafoil motion vector 712A is the addition of the wind vector 704A with the selected solution vector 708A.

In act 406, the flight control system determines a backing-in solution that does mitigate the effect of wind. FIG. 7B illustrates a backing-in homing strategy 700B. The backing-in homing strategy 700B includes a current parafoil location 702B and a wind vector 704B that extends from the current parafoil location 702B. The direction towards the target from the current location is illustrated by direction 706B. Accordingly, a direction needs to be determined that counteracts the wind and yields a direction of travel towards the target. Solution vectors 708B and 710B compensate for the component of the wind vector 704B that is perpendicular to the desired direction of travel 706B. Solution 708B, however, yields a motion vector that would cause the parafoil system to overshoot the target location. Accordingly, solution 710B is selected that yields parafoil motion vector 712B that has a substantially smaller magnitude than a motion vector produced by solution 708B. The parafoil motion vector 712B is the addition of the wind vector 704B with the selected solution vector 710B.

In act 408, the flight control system adjusts the actuators connected to the suspension lines of the parafoil. The actuators are adjusted to steer the parafoil in the direction calculated in one of acts 404 and 406. In act 410, the flight controller determines whether the homing stage is complete. The determination may be made based on, for example, a proximity to the target location.

Figure 5:
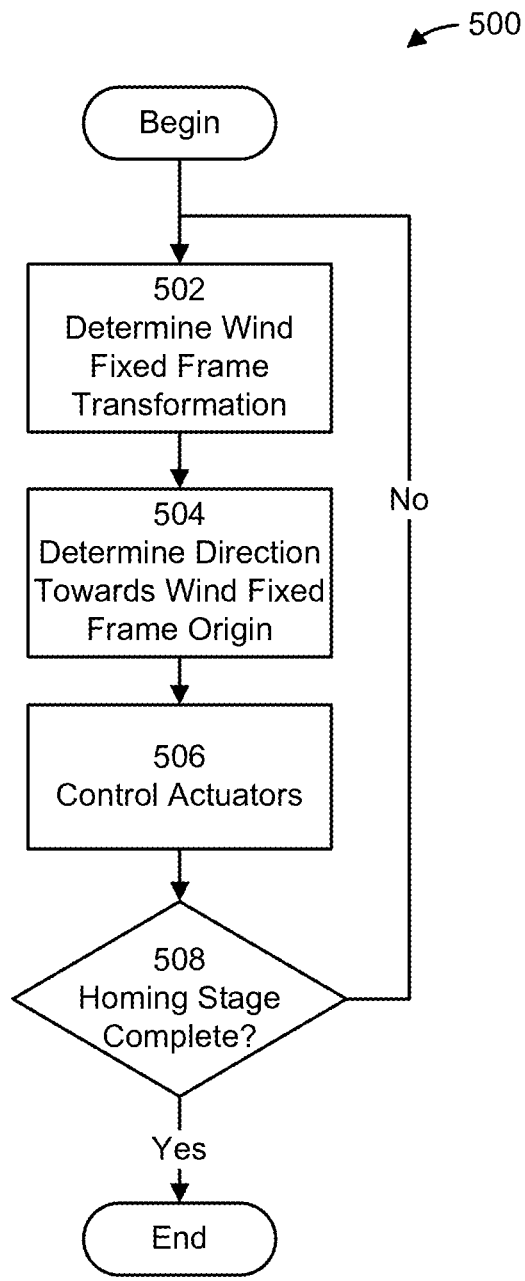
FIG. 5 is a flow diagram of another example of a homing process according to aspects of the invention.

FIG. 5 illustrates another embodiment of a homing process 500. The homing process 500 relies on a relationship between a ground frame and a wind fixed frame to determine a desired heading for the parafoil system. The wind fixed frame takes into account the effect of wind at various altitudes on the flight path of the parafoil system. A baseline path may be created in the wind fixed frame that corresponds to the flight path of a point mass (e.g., a leaf) in the wind that reaches the target location. A control strategy may then be generated that directs the parafoil system towards the baseline path in the wind fixed frame. The control signals generated with reference to the wind fixed frame may be transformed back to the ground reference frame via the previously generated wind fixed frame to ground frame relationship.

In act 502, the flight control system determines a wind fixed frame transformation. The relationship between the current frame and the wind fixed frame may be created based on wind knowledge at one or more altitudes. The coordinate transformation generates a relationship between the translational coordinates in the ground reference frame to translational coordinates in a wind-fixed reference frame. The transformation includes translating the coordinates to take into account the effects of the wind on a point-mass system (e.g., a leaf) in addition to rotating the frame to take into account the desired terminal heading. The translation of the components from the ground reference frame to the wind-fixed frame may be represented by the following equations:

$$x_{w,trans} = x_g + \Sigma_h w_x(h)dt(h) \quad (1)$$

$$y_{w,trans} = y_g + \Sigma_h w_y(h)dt(h) \quad (2)$$

Figure 8:
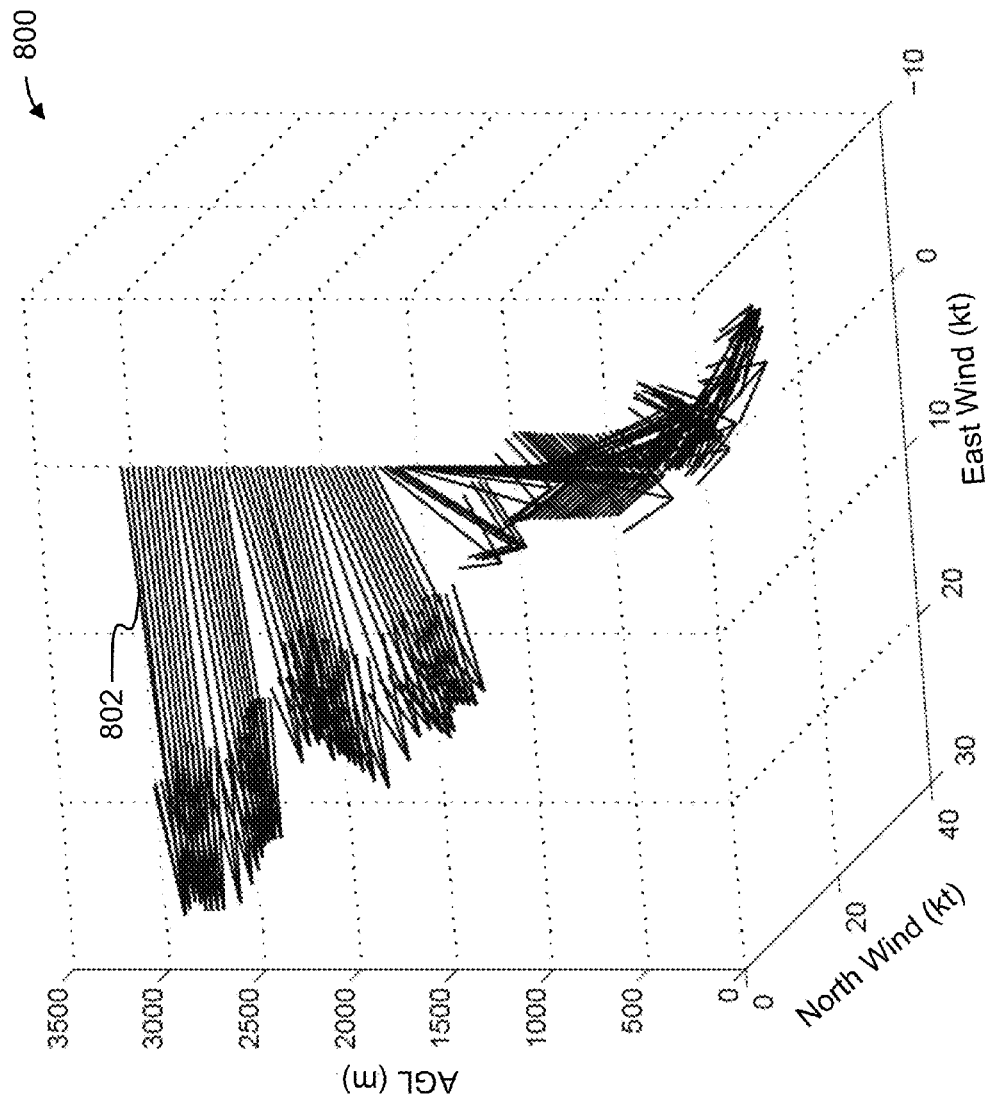
FIG. 8 is an example of a wind vector graph.

In equations (1) and (2), $x_g$ and $y_g$ are the translational coordinates in the ground reference frame that will be transformed into the wind fixed frame as a function of height h. As illustrated by equations (1) and (2), the translational coordinates in the wind fixed frame are equal to the ground translational coordinates plus the sum of the wind vectors $w_x$ and $w_y$ between the ground and the current height h. FIG. 8 illustrates an example wind direction graph 800 that includes various wind vectors 802 that correspond to various $w_x$ and $w_y$ values as a function of altitude. It is appreciated that wind speed and direction may be estimated consistent with a model or extrapolated from limited wind data. For example, the flight control system may only have access to wind vectors at a given altitude above the ground. In this example, the flight controller may estimate the wind at lower altitudes by estimating that the wind velocity will decay consistent with a model (e.g., a decaying exponential) as the altitude decreases.

The coordinate frame may then be rotated to account for the desired terminal heading. The rotation may be performed consistent with the equations (3) and (4) below:

$$\begin{bmatrix} y_w \\ x_w \end{bmatrix} = R_g^w(\theta_{term,g,flip}) \begin{bmatrix} y_{w,trans} \\ x_{w,trans} \end{bmatrix} \quad (3)$$

$$\theta_w = \theta_g - \theta_{term,g,flip} \quad (4)$$

In equation (3), $x_w$ and $y_w$ are the final coordinates in the wind fixed frame. The rotation matrix R is a function of $\theta_{term,g,flip}$. The term $\theta_{term,g,flip}$ may be selected such that the $\theta_w$ term, as represented in equation (4), is equal to the direction of the wind at ground level.

In act 506, the system steers the payload delivery system toward a desired heading consistent with the following equation:

$$\theta_{des} = a\tan 2(-y_w, -x_w) + \theta_{term,g,flip} \quad (5)$$

Figure 9:
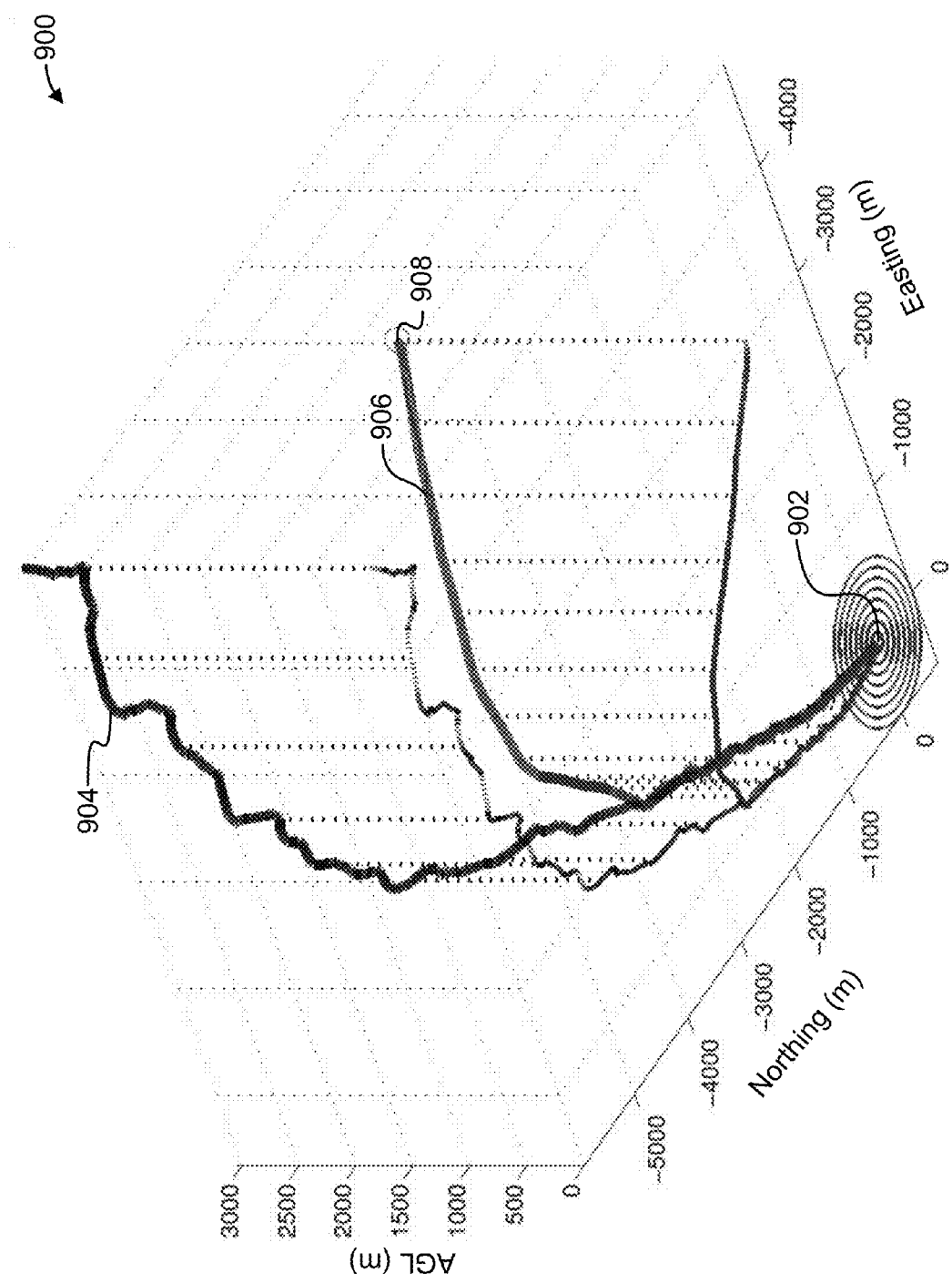
FIG. 9 is a diagram showing another example of a planned path generated by a homing process according to aspects of the invention.

The desired heading $\theta_{des}$ is calculated as the origin of the wind fixed frame at a given altitude. FIG. 9 illustrates a homing process planned path 900 consistent with homing process 500. The homing process planned path 900 includes a baseline path 904 that illustrates the transformation from the ground frame to the wind fixed frame, as described above with references to equations (1), (2), (3), and (4), using the wind information illustrated in FIG. 8. The baseline path 904 comprises the origins of each 2-Dimensional cross section of the graph as a function of altitude. As described above with reference to equation (5), the parafoil is directed towards the origin of each frame (i.e., each 2-D cross section of the graph) as illustrated by parafoil path 906. The parafoil starts at location 908 and moves toward the baseline path 904. This approach increases the likelihood of the parafoil system reaching the target in the presence of high wind. In the example winds illustrated in FIG. 8 and the starting location 908 illustrated in FIG. 9, a parafoil system that was directed towards the target would have been blown downwind of the target.

In act 508, the system adjusts the actuators as appropriate towards the desired heading computed by equation (5) in act 506. In act 510, the flight controller determines whether the homing stage is complete. The determination may be made based on, for example, a proximity to the target location.

Figure 6:
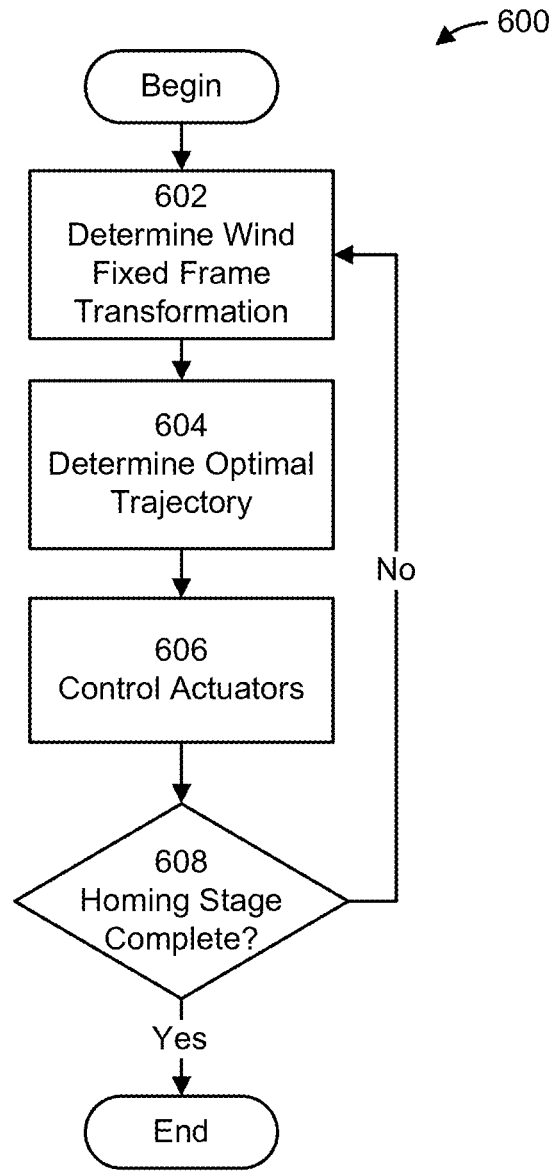
FIG. 6 is a flow diagram of another example of a homing process according to aspects of the invention.

FIG. 6 illustrates another embodiment of a homing process 600. Homing process 600 reframes the system dynamics of the parafoil system as a function of path length rather than a function of height. Formulating the system dynamics as a function of path length facilitates the application of optimal control techniques to generate an optimal trajectory between a starting position and a final target position while still leveraging the wind fixed frame coordinate transformation discussed above. The generated optimal trajectory may be created to, for example, minimize the amount of control energy expended while the parafoil system is in flight.

The various equations previously derived are generally a function of altitude (i.e., independent variable h). Reformulating the problem as a function of path length variable s of a total fixed path length S facilities the generation of an appropriate trajectory between a current location of the parafoil system and a target location. In one embodiment, the generated trajectory starting at $X_S=[x_S, y_S, \theta_S]^T$ and ending at $X_0=[0, 0, \pi]^T$ minimizes the amount of control energy exerted during flight. Equations (6)-(8) below describe how to find a specific optimal trajectory that satisfies derived necessary optimality conditions:

$$\underset{k \in [0,1), j \in [0,1)}{\text{minimize}} J = (x_S - x_{S,k,f,n})^2 + (y_S - y_{S,k,f,n})^2 \quad (6)$$

$$\left|\sin\left(\frac{\theta_{S,new} - \pi}{2}\right)\right| - k < 0 \quad (7)$$

$$\left\{\phi, \frac{\theta}{2}\right\}_{begin} - \left\{\phi, \frac{\theta}{2}\right\}_{end} < 0 \quad (8)$$

The variables $\hat{x}_{S,k,f,n}$ and $\hat{y}_{S,k,f,n}$ are representative of desired coordinates at the given time step formed by a trajectory and $x_S$ and $y_S$ are representative of the current coordinates at the current time step. Various trajectories are formed by varying trajectory characteristics including n, an integer multiple number of loops in the trajectory, f, a percentage of allowed trajectory shift and/or rotation, and k, an elliptic modulus term. The specific optimal trajectories found employing equations (6)-(8) may take two forms, termed undulating and nodal, captured in equations (9)-(14) and (16)-(22), respectively below.

In one embodiment, trajectories from the undulating family are employed to determine desired coordinates $\hat{x}_{S,k,f,n}$ and $\hat{y}_{S,k,f,n}$ in equation (6). For example, trajectories from the undulating family may be generated as a function of k, f, and n as illustrated below with reference to equations (9)-(15):

$$\begin{bmatrix} \hat{x}_{S,k,f,n} \\ \hat{y}_{S,k,f,n} \end{bmatrix} = \quad (9)$$

$$R(\theta_{begin})\left[\frac{1}{c}(2E(\phi_{end}, k) - F(\phi_{end}, k) - 2E(\phi_{begin}, k) + F(\phi_{begin}, k)) \pm \frac{2k}{c}(|(-1)^n - \cos\phi_{end}| - |(-1)^n - \cos\phi_{begin}|)\right]$$

-continued $$\phi_{begin} = (n + 0.5)f\pi - n\pi \quad (10)$$

$$\theta_{begin} = 2\arcsin(k\sin(\pm(-1)^n \phi_{begin})) \quad (11)$$

$$\theta_{S,new} = \theta_S + \theta_{begin} \mod 2\pi \quad (12)$$

$$\phi_{end} = \pm(-1)^n \arcsin\frac{\sin\frac{(\theta_{S,new} + \pi)}{2}}{k} \quad (13)$$

$$c = \frac{1}{S}[F(\phi_{end}, k) - F(\phi_{begin}, k)] \quad (14)$$

$$R(\theta_{begin}) = \begin{bmatrix} \cos\theta_{begin} & -\sin\theta_{begin} \\ \sin\theta_{begin} & \cos\theta_{begin} \end{bmatrix} \quad (15)$$

In equation (9), the functions F(.,.) and E(.,.) refer to incomplete elliptic integrals of the first kind and the second kind, respectively. As illustrated by equation (11), the variable $\theta_{begin}$ in can be one of two values depending upon the sign of the $(-1)^n$ term. The two possible values of $\theta_{begin}$ represent the mirror equivalents of the formed trajectory from the undulating family. Accordingly, equation (9) may yield two trajectory solutions for any given set of values of k, f, and n.

In one embodiment, trajectories from the nodal family are employed to determine desired coordinates $\hat{x}_{S,k,f,n}$ and $\hat{y}_{S,k,f,n}$. For example, trajectories from the nodal family may be generated as a function of k, f, and n as illustrated below with reference to equations (16)-(22):

$$\begin{bmatrix} \hat{x}_{S,k,f,n} \\ \hat{y}_{S,k,f,n} \end{bmatrix} = R(\theta_{begin})\left[\frac{2k}{c}\left[E\left(\frac{\theta_{end}}{2}, \frac{1}{k}\right) - E\left(\frac{\theta_{begin}}{2}, \frac{1}{k}\right) - \left(1 - \frac{1}{2k^2}\right)\left(F\left(\frac{\theta_{end}}{2}, \frac{1}{k}\right) - F\left(\frac{\theta_{begin}}{2}, \frac{1}{k}\right)\right)\right] \pm \frac{2k}{c}\left[\left(1 - \sqrt{1 - \left(\frac{1}{k}\right)^2 \sin^2\frac{\theta_{end}}{2}}\right) - \left(1 - \sqrt{1 - \left(\frac{1}{k}\right)^2 \sin^2\frac{\theta_{begin}}{2}}\right)\right]\right] \quad (16)$$

$$\frac{\theta_{begin}}{2} = (n + 0.5)f\pi - n\pi \quad (17)$$

$$\theta_{begin} = \pm 2\frac{\theta_{begin}}{2} \quad (18)$$

$$\theta_{S,new} = \theta_S + \theta_{begin} \mod 2\pi - (1 - \pm 1)\pi \quad (19)$$

$$\frac{\theta_{end}}{2} = \frac{1}{2}(\pm\theta_{S,new} - \pi) \quad (20)$$

$$c = \frac{1}{kS}\left[\left(F\left(\frac{\theta_{end}}{2}, \frac{1}{k}\right) - F\left(\frac{\theta_{begin}}{2}, \frac{1}{k}\right)\right)\right] \quad (22)$$

In equation (16), the functions F(.,.) and E(.,.) refer to incomplete elliptic integrals of the first kind and the second kind, respectively. In addition, the function $R(\theta_{begin})$ may be determined similarly to the function $R(\theta_{begin})$ in equation (15) illustrated above. As illustrated by equation (18), the variable $\theta_{begin}$ can be one of two values depending upon the sign of the term. The two possible values of $\theta_{begin}$ represent the mirror equivalents of the formed trajectory from the nodal family. Accordingly, equation (16) may yield two trajectory solutions for any given set of values of k, f, and n.

Figure 10B:
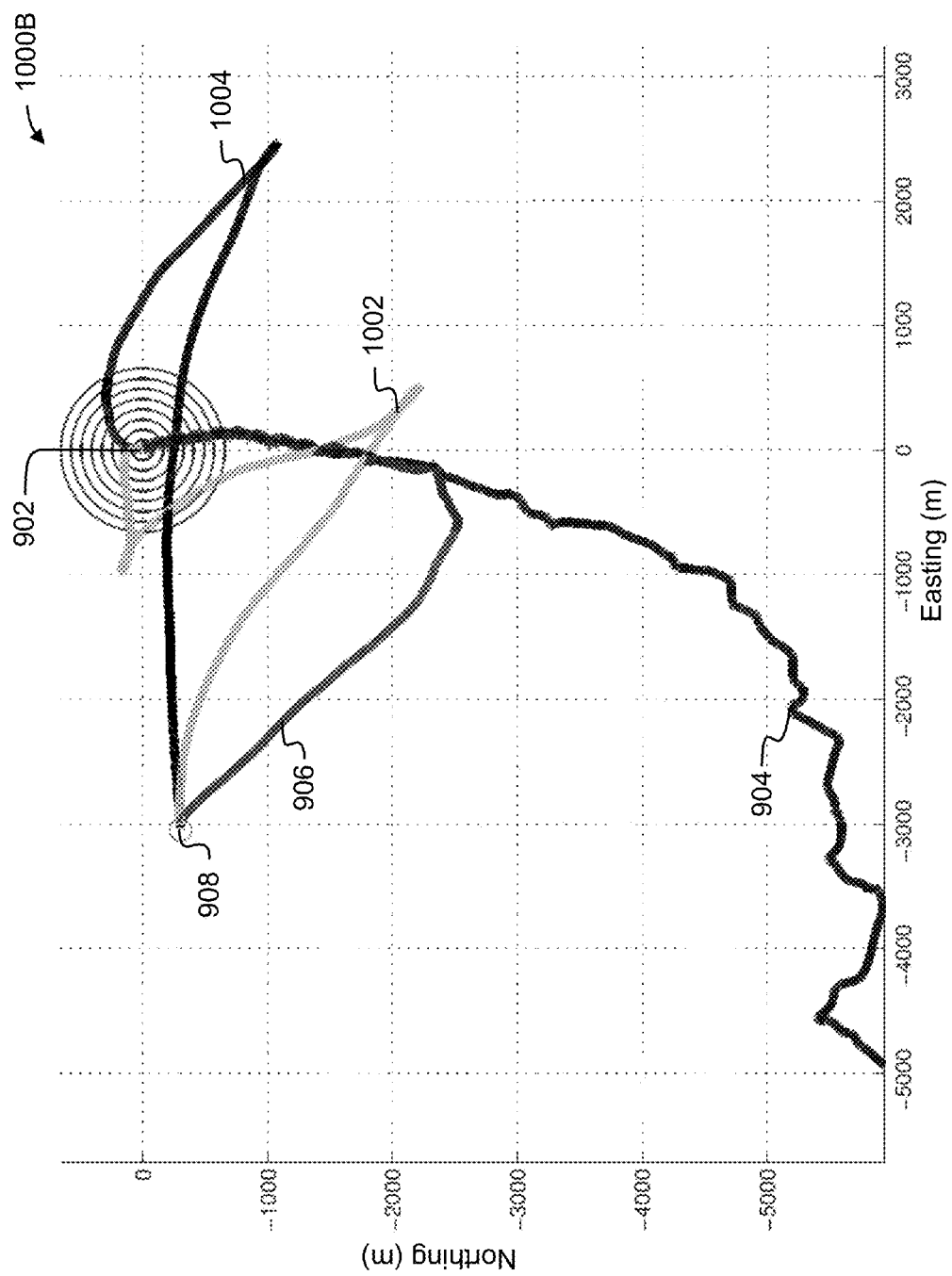

As discussed above, various trajectories may be generated from, for example, the undulating family and the nodal family of trajectories by varying values of k, f, and n. In one embodiment, an optimal trajectory may be found that minimizes the amount of control energy exerted, as outlined in equations (6), (7), and (8), may be determined via a grid optimization approach or a Sequential Quadratic Programming (SQP) optimization approach. The grid optimization approach reduces the computational complexity of the optimization process by testing a finite set of trajectories formed from a discrete number of trajectory families each with a set of discrete values of k, f, and n. In contrast, the SQP optimization approach employs an iterative method that is of greater computational complexity. FIG. 10A illustrates example homing planned paths 1000A formed from the SQP and grid based optimization approaches. FIG. 10B illustrates example homing planned paths 1000B as illustrated with reference to the planned paths 1000A in only the ground-based reference frame. As described above with reference to FIG. 9, baseline path 904 is the baseline path in the wind fixed frame, and parafoil path 906 starting at location 908 is the planned path generated from a wind fixed frame homing method as described with reference to FIG. 5. Parafoil path 1002 represents the trajectory formed from solving the optimization problem outlined by equations (6), (7), and (8) using a grid optimization approach, while parafoil path 1004 illustrated the trajectory generated through Sequential Quadratic Programming (SQP) optimization. Although grid optimized trajectory 1002 does require more control energy than SQP optimized trajectory 1004, it offers a simpler approach to determine an optimal trajectory.

In act 606, the system adjusts the actuators as appropriate towards the desired heading computed based on the trajectory formed from solving equations (6), (7), and (8) in act 604. In act 608, the flight controller determines whether the homing stage is complete. The determination may be made based on, for example, a proximity to the target location.

Having now described some illustrative aspects of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. Furthermore, it will be appreciated that the systems and methods disclosed herein are not limited to any particular application or field, but will be applicable to any endeavor wherein a value is apportioned among several placements.

Where technical features in the drawings, detailed description, or any claim are followed by references signs, the reference signs have been included for the sole purpose of increasing the intelligibility of the drawings, detailed description, and claims. Accordingly, neither the reference signs nor their absence are intended to have any limiting effect on the scope of any claim placements.

What is claimed is:

1. A flight controller constructed to control a parafoil in flight from a starting location to a target location, the flight controller comprising:
    an actuator interface constructed to connect to one or more actuators;
    a sensor interface constructed to connect to one or more wind sensors;
    a memory;
    at least one processor coupled to the memory, the sensor interface, and the actuator interface;
    a flight manager component executable by the at least one processor and configured to:
        identify the target location and the starting location;
        receive wind data from the one or more wind sensors;
        determine a wind fixed reference frame based on the wind data that takes into account an impact of wind on a flight path;
        determine a relationship between a ground reference frame and the wind fixed reference frame;
        generate at least one trajectory between the starting location and the target location in the wind fixed reference frame based on a cost function that minimizes an amount of control energy required to complete the trajectory;
        transform the at least one trajectory in the wind fixed reference frame from the wind fixed reference frame to a ground reference frame based on the relationship between the ground reference frame and the wind fixed reference frame;
        determine a desired heading based on the at least one trajectory in the ground reference frame; and
        generate an actuator control signal based on the desired heading to adjust a heading of the parafoil.

2. The flight controller of claim 1, wherein the flight manager component is further configured to generate a plurality of trajectories between the starting location and the target location.

3. The flight controller of claim 2, wherein at least one trajectory of the plurality of trajectories is from one of a nodal family of trajectories and an undulating family of trajectories.

4. The flight controller of claim 2, wherein the flight manager component is further configured to select an optimal trajectory from the plurality of trajectories that minimizes the amount of control energy.

5. The flight controller of claim 4, wherein the flight manager component is further configured to select the optimal trajectory by at least one of grid optimization and SQP optimization.

6. The flight controller of claim 4, wherein the flight manager component is further configured to determine the desired heading based on the optimal trajectory.

7. The flight controller of claim 2, wherein the flight manager component is further configured to generate the plurality of trajectories by varying a number of loops in the at least one trajectory and a percentage of allowed trajectory shift in the at least one trajectory.

8. The flight controller of claim 1, wherein the flight manager is further configured to generate estimated wind data based on the received wind data.

9. The flight controller of claim 8, wherein the flight manager is further configured to determine the wind fixed reference frame based on the received wind data and the estimated wind data.

10. A method of controlling a parafoil in flight from a starting location to a target location, the method comprising:
    identifying the target location and the starting location;
    receiving wind data;
    determining a wind fixed reference frame based on the wind data that takes into account an impact of wind on a flight path;
    determining a relationship between a ground reference frame and a wind fixed reference frame;
    generating at least one trajectory between the starting location and the target location in the wind fixed reference frame based on a cost function that minimizes an amount of control energy required to complete the trajectory;
    transforming the at least one trajectory in the wind fixed reference frame from the wind fixed reference frame to a ground reference frame based on the relationship between the ground reference frame and the wind fixed reference frame;

determining a desired heading based on the at least one trajectory in the ground reference frame; and generating an actuator control signal based on the desired heading to adjust a heading of the parafoil.

11. The method of claim 10, wherein generating the at least one trajectory includes generating a plurality of trajectories between the starting location and the target location in the wind fixed reference frame.

12. The method of claim 11, wherein generating the plurality of trajectories includes generating one or more trajectories from at least one of a nodal family of trajectories and an undulating family of trajectories.

13. The method of claim 11, further comprising selecting an optimal trajectory from the plurality of trajectories that minimizes the amount of control energy.

14. The method of claim 13, wherein selecting the optimal trajectory includes selecting the optimal trajectory by one of grid optimization and SQP optimization.

15. The method of claim 13, wherein determining the desired heading based on the at least one trajectory includes determining the desired heading based on the optimal trajectory.

16. The method of claim 10, further comprising generating estimated wind data based on the received wind data.

17. The method of claim 16, wherein determining the wind fixed reference frame includes determining the wind reference fixed frame based on the received wind data and the estimated wind data.

* * * * *